June 29, 1965   R. GOALARD   3,191,982
APPARATUS FOR TRANSPLANTING PLANTS OR TREES
Filed Jan. 23, 1962   3 Sheets-Sheet 1
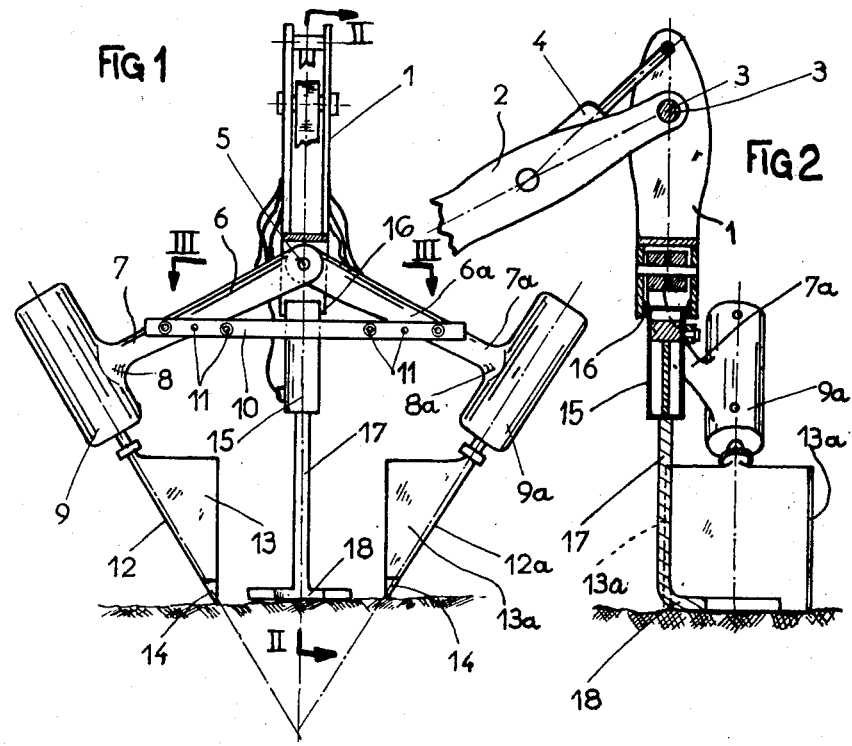
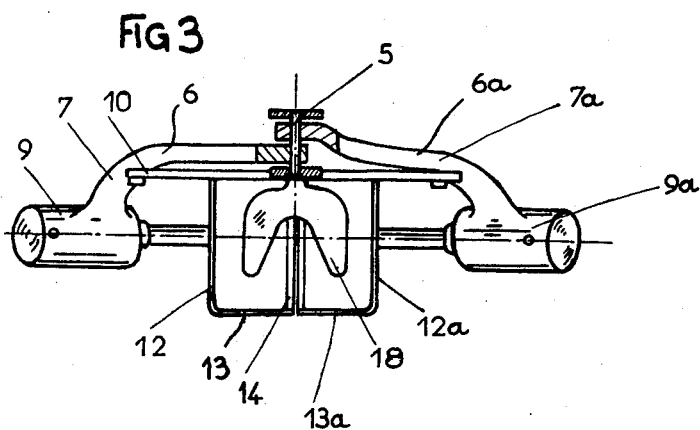

June 29, 1965  R. GOALARD  3,191,982
APPARATUS FOR TRANSPLANTING PLANTS OR TREES
Filed Jan. 23, 1962  3 Sheets-Sheet 2
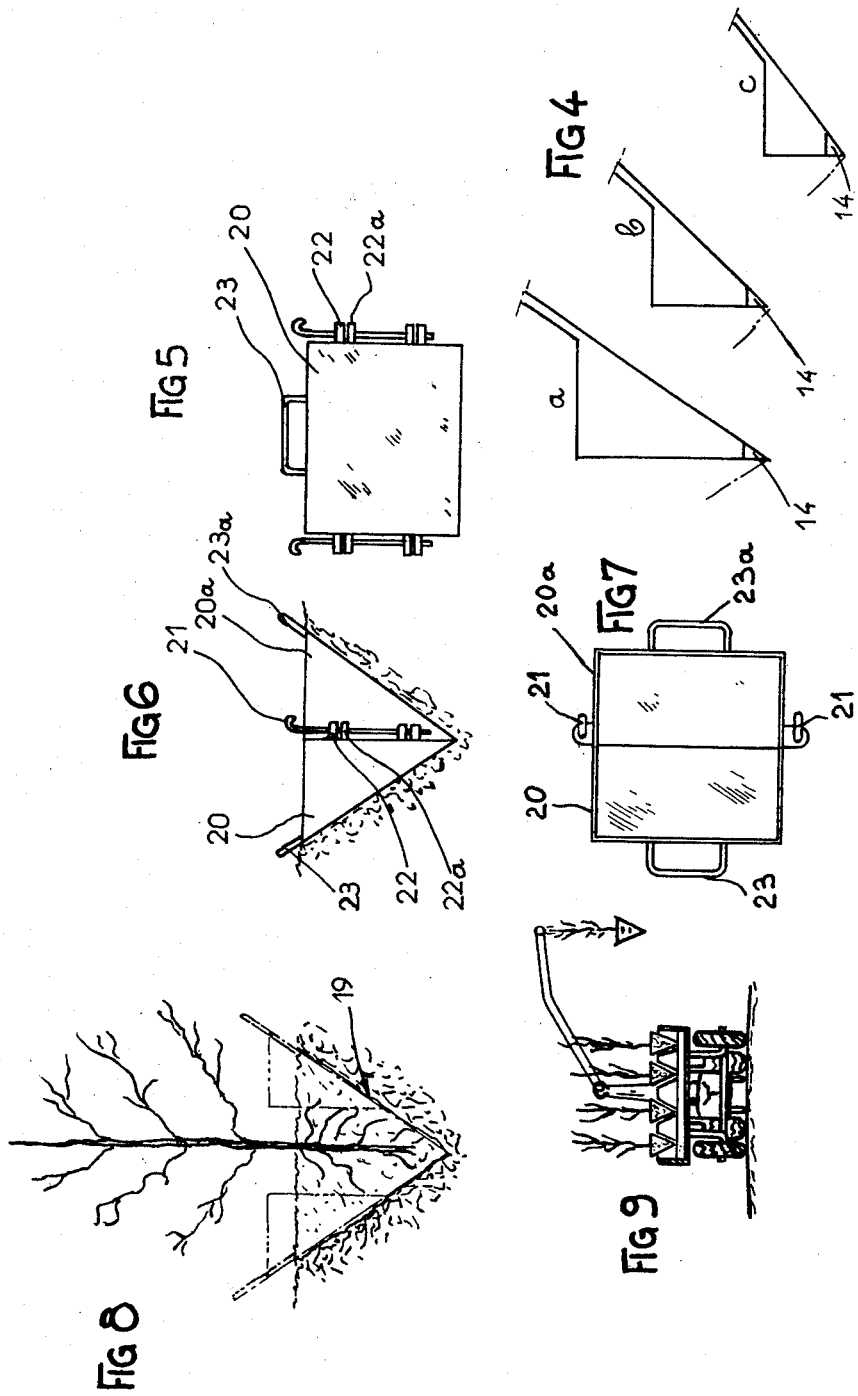

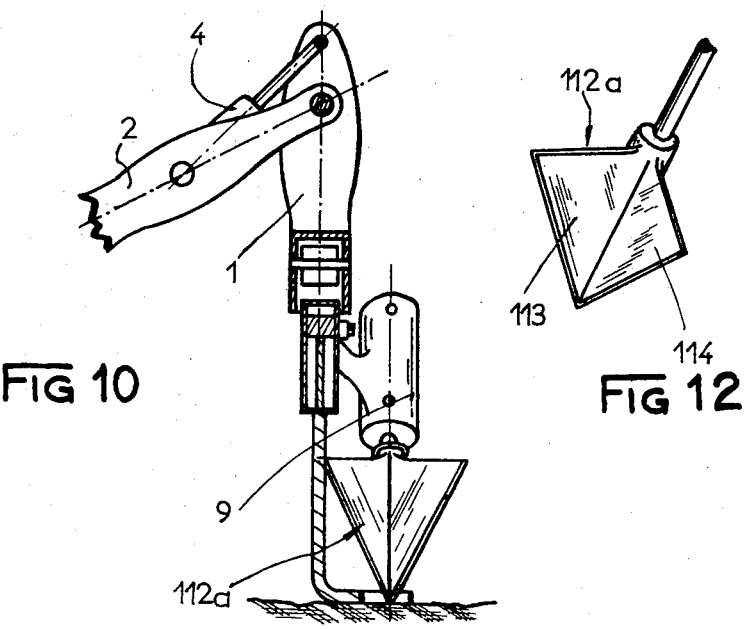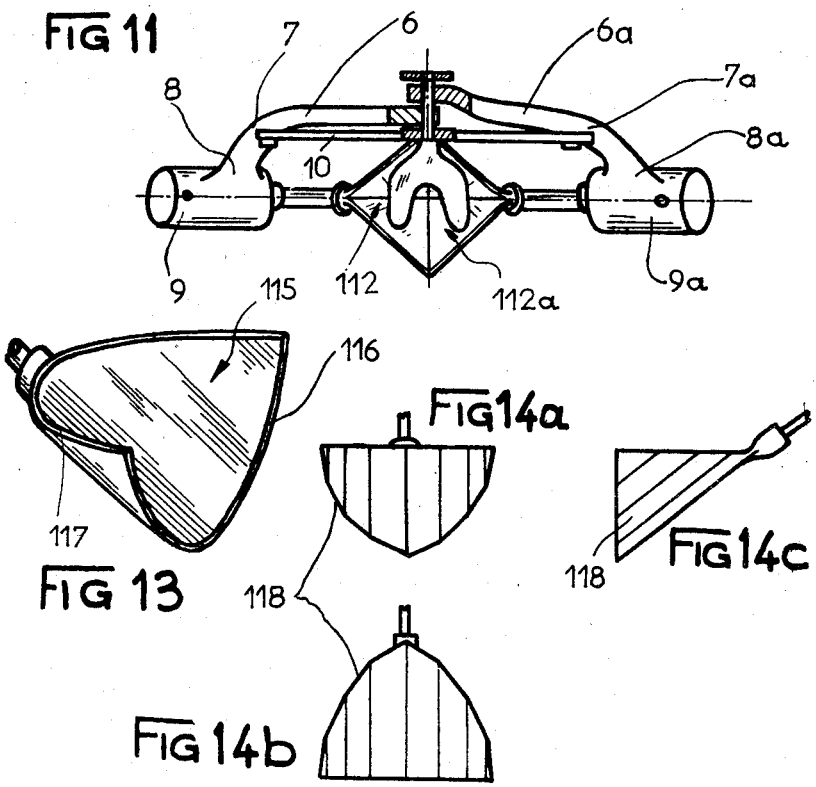

United States Patent Office 3,191,982
Patented June 29, 1965

3,191,982
APPARATUS FOR TRANSPLANTING PLANTS OR TREES
Robert Goalard, 42 Rue de la Dauphine, Gauderan, Gironde, France
Filed Jan. 23, 1962, Ser. No. 168,155
Claims priority, application France, Jan. 31, 1961, 851,280
1 Claim. (Cl. 294—70)

This invention relates to methods and apparatus for rooting up and replanting trees, plants or the like.

In known processes of this character, a tree or plant is usually grubbed up either manually by using a spade or mechanically by using a kind of spoon.

With these methods it is possible to root up relatively young trees and to remove with the roots a very light ball of earth (weighing approximately from 4 to 12 pounds) adhering thereto. With the use of known techniques, the replanted tree has a poor resistance to prolonged frost or flood, and the growth is stopped for about one year.

Moreover, known processes are relatively costly for they involve the use of considerable skilled labor (for preparing the soil, trimming the roots, transporting the tree, etc., plus the labor necessary for rooting up the tree when the process is carried out manually).

With the improved method constituting one of the essential objects of this invention these various drawbacks can be avoided and notably much of the labor hitherto necessary in the known processes can be dispensed with, so that older plants and seedlings can be replanted with considerably heavier balls, thus ensuring an immediate resumption of the growth process, a satisfactory stability of the plant and a higher degree of protection against surrounding vegetation. In addition, in case of prolonged frost or drought the plant or seedling will display a much better resistance.

The method of this invention is remarkable notably in that it consists of isolating from the surrounding soil the roots of the tree and the ball adhering thereto, by driving into the ground around the tree two or more cutting blades mounted on a common support, and causing these blades to converge with a pre-selected angle, through a movement of translation in their planes, toward a zone in which their lower and/or side edges contact each other, so that these blades form with and between each other a closed or partially closed volume open at the top and enclosing the roots of the tree together with the earth ball adhering thereto, and finally lifting said blades held in this convergent position for transporting and replanting the tree.

According to another feature of this invention, a hole having dimensions corresponding substantially to those of said earth ball is prepared in the soil at the location selected for replanting the tree, this step being effected by applying a method similar to the one disclosed in the preceding paragraph for rooting up the tree.

According to a further feature characterizing this invention said blades are introduced into the aforesaid hole in their convergent position, with the roots and the earth ball clamped therebetween, and the blades are subsequently moved away from each other in their planes while applying if desired a pressure on the top of the earth ball by means of a heel or like member for maintaining the stability of the tree and promoting the sliding movement of translation of said blades.

It is another feature of this invention to strip the ball into a detachable mould and transport the tree and the ball in said mould to the desired location, the mould being positioned in said hole and its lateral elements subsequently separated by pulling them up along the edges of said hole in order to leave said ball of earth in the hole.

It will be readily understood that with the method of this invention the steps of rooting up, transporting and replanting of the trees are entirely mechanical. Labor is necessary only for operating the apparatus, selecting the plant or tree and to preparing the same if necessary, and wedging it in its new position upon completion of the transplanting step.

With the method of this invention it is possible to root up relatively large plants of 6 feet and more, with balls of earth which may be as heavy as 220 lbs. if necessary.

Of course, with this method the plant resumes immediately its growth and is efficiently protected against surrounding vegetation, and even in case of prolonged frost or flood, its resistance is considerably improved.

This invention is also concerned with an apparatus for carrying out the method broadly set forth hereinabove, this apparatus being remarkable notably in that it comprises two or more cutting blades mounted on a common support or frame structure and to which a movement of translation in their planes may be imparted to cause them to converge toward each other, until their lower and/or lateral edges contact, or are relatively close to, each other, in order to form therebetween a closed or partially closed volume open at the top.

According to another feature of this invention the aforesaid blades are disposed laterally in relation to said support and to the driving members associated therewith, whereby the space overlying directly said convergent or nearly convergent blades remains free and accessible.

It is another feature of this invention to anchor or secure said support on the luffing and swivelling of a hoisting device whereby this support can be displaced both vertically and horizontally.

Finally, this invention provides as a further object a mould adapted to be taken to pieces for transporting the tree. With this mould the tree can be transported with its ball of earth to any desired location and replanted there without having to trim the ball.

Other features and advantages of this invention will appear as the following description proceeds with reference to the accompanying drawings given by way of example. In the drawings:

FIGURE 1 illustrates in front view an apparatus for rooting up trees and plants;

FIGURE 2 is a longitudinal section taken upon the line II—II of FIGURE 1;

FIGURE 3 is another section taken upon the line III—III of FIGURE 1, the cutting blades being convergent;

FIGURE 4 illustrates various types of blades utilized in the apparatus of FIGURE 1;

FIGURE 5 is a front view showing a mould utilized for transporting the tree;

FIGURE 6 is a side elevational view of the mould of FIGURE 5;

FIGURE 7 is a plan view from above of the same mould;

FIGURE 8 is a vertical section illustrating the positioning of a transplanted tree;

FIGURE 9 is a diagrammatic view showing an apparatus constructed according to the teachings of this invention, with a trailer for transporting trees;

FIGURE 10 is a vertical longitudinal section of a grubbing apparatus according to this invention;

FIGURE 11 is a plan view from above showing the same apparatus with parts broken away;

FIGURE 12 is a perspective view showing a cutting blade of the same apparatus;

FIGURE 13 is an alternate embodiment of a cutting blade; and

FIGURES 14a, 14b and 14c illustrate another embodiment of the cutting blade as seen in front elevation, plan view and side view respectively.

The apparatus illustrated in FIGURES 1 to 3 constitutes a typical embodiment of the method of this invention.

In this example the apparatus comprises a support or frame structure 1 anchored or secured on the luffing and swivelling arm 2 of a hoisting apparatus of any suitable type already known per se, and adapted to displace the support 1 both vertically and horizontally.

Thus, in this example the support 1 is pivotally mounted on the end 3 of the boom, jib or arm 2 of a tractor, crane or like hoisting machine. A hydraulic cylinder 4 controls the angular movements of this support in a vertical plane, and the arm 2 is adapted to travel in known manner horizontally and vertically, for example through known luffing and swivelling means.

Pivotally mounted on the support 1 about a pin 5 are a pair of arms 6, 6a extending symmetrically in relation to this pin. These arms 6, 6a are bent inwards as shown at 7, 7a in FIGURE 3 and carry on their outer ends 8, 8a two hydraulic cylinders or like devices 9, 9a lying preferably in a common plane preferably parallel to the support 1; these cylinders or like devices 9, 9a are inclined in relation to the arms 6, 6a so as to form an angle of about 90° therewith. Of course, if desired, a different angle may be selected without departing from the scope of the invention.

An adjustable spacer bar 10 interconnects the ends of the aforesaid arms 6, 6a so that they form a predetermined angle with each other. This bar 10 has a number of orifices 11 formed therethrough and is secured on the arms 6, 6a by means of screws, keys or the like which extend through the orifices corresponding to the selected relative spacing.

If desired, a hydraulic or pneumatic cylinder or any other suitable adjustment means may be substituted for the spacer bar 10, an alternate construction comprising for example arms 6, 6a secured directly on the support 1 with a permanent relative spacing.

The angle formed between the cylinders 9, 9a is the angle of convergence of two cutting blades 12, 12a each mounted on the end of the rod of the relevant cylinder 9, 9a, in axial alignment therewith. As a consequence of the curvature of the arms 6, 6a and the position of cylinders 9, 9a, the space overlying the blades 12, 12a is completely free as the support 1 and cylinders 9, 9a are located outside this space.

The cutting blades 12, 12a, in the example illustrated, are identical with each other and comprise side wings 13, 13a, having the shape of right-angled triangle, the lower angle of these wings being equal to half the angle of convergence of the blades.

In FIGURE 4 the reference letters a, b and c designate different cutting blades 12 (12a). These blades are formed with a lower sharp and strong edge 14 of special or alloy steel, for the purpose contemplated. The lower angle of the side wings of the blade is selected as a function of the specific nature of the soil, the kind and age of the tree, etc., and may be selected for example in the region of 30° from the vertical. Similarly, the dimensions of these blades may also vary. It will be seen that with this construction, when the cylinders 9, 9a are actuated, after their relative angular position has been adjusted by means of the spacer bar 10, so that they form together an angle representing twice the lower angles of the side wings 13 of blades 12, the blades are caused either to converge toward each other until their lower edges 14 (14a) and the edges of the side wings (13, 13a) contact or nearly contact each other, or through an opposite action to move away from each other (see FIGURES 1 and 2).

Of course, cutting blades having a considerably different shape could be used without departing from the spirit and scope of the invention. Moreover, the blades are not compulsorily movable in the same plane provided that their two movements converge and that in their converging position they form between their edges a closed or partially closed volume open at the top.

On the other hand another cylinder 15 is secured on the lower end of the support at 16 so that its rod is in alignment with the support, this rod having a heel extension 17 the end portion 18 of which is bent to form a kind of strap or yoke, as shown (FIGURE 3). This bent end portion engages the space formed by the upper edges of the convergent cutting blades 12, 12a, and the side arms of the strap or yoke surround the center of said space.

If the apparatus comprises cutting blades of the type described with reference to FIGURES 1 to 4, the ball of earth can be engaged without difficulty by means of these blades and deposited into a mould of corresponding cross-sectional contour if this mould has its parallel faces more spaced apart than those of the ball. As a result, when the ball of earth is introduced into the mould the vertical edges of the ball are frequently disintegrated, so that there is a risk of breaking the ball. Obviously, this drawback may interfere with the resumption of the growing process of the plant or tree.

By using two cutting blades having the shape of surface elements cut from a cylinder or a prism and mounted on the above-described apparatus so as to have a common axis of symmetry, the aforesaid movement of translation of said blades will take place substantially in the direction of the generatrices of said cylinder or prism, and the inconvenience set forth in the preceding paragraph will be avoided.

If fact, if the ball of earth is so cut that it is limited by cylindrical or prismatic surfaces, it can be easily introduced into a mould of same configuration; thus, the ball, instead of disintegrating, will be clamped in the mould.

FIGURES 10 to 14c illustrate various forms of cutting blades for obtaining this result.

To facilitate the understanding of the drawings, the blade is shown in FIGURE 12 as mounted on the apparatus of FIGURE 1 respectively in longitudinal section (FIGURE 10) and in plan view (FIGURE 11). In the example illustrated in FIGURES 10 to 12 these blades 112, 112a consist each of two triangular elements 113, 114 assembled along one of their sides and the volume formed by the blades 112, 112a when they are in their position of maximum convergence has substantially the shape of a regular pyramid having a square base. Of course, it is also possible to use other blade shapes. It will be readily understood that a good penetration of these blades in the soil can be obtained by using blades cut from a cylindrical or prismatic surface displaced by the action of cylinders 9, 9a substantially in the direction of their generatrices. Thus, for example, the cutting blades of the type illustrated at 115 in FIGURE 13 may be used. The blade 115, in cooperation with the companion blade (not shown), forms a volume bound by fractions of cylindrical surfaces assembled along their edges 116. These edges 116 have a curvature corresponding substantially to an ellipse when the cylinder from which the blades have been cut has a circular cross-section. Of course, the same applies to the curve defining the horizontal section 117 at the top of the blade 115 illustrated in FIGURE 13. If desired, blades cut from prismatic surfaces as shown at 118 in FIGURES 14a, 14b and 14c may also be used. The blade 118 is shown in elevational view, plan view and side view respectively in these figures.

Of course, this blade may have a straight polygonal cross-section having any desired number of sides.

The operation of the above-described apparatus is extremely simple:

The operator driving the tractor shown in end view in FIGURE 9 selects the tree or plant to be rooted up.

He then selects the type of cutting blades 12, 12a to be used as a function of the nature of the soil and the kind of tree to be transplanted. He secures the blades on the end of the rods of cylinders 9, 9a so that the apparatus is in the position illustrated in FIGURE 1. Then the operator positions the apparatus around the tree, the shaft of this tree being surrounded by the strap or yoke-shaped heel 18. Thus, the cutting blades are disposed on either side of the tree. The height of the downward movement of the cutting blades is selected and adjusted by acting upon the heel 18 by means of the cylinder 15 associated therewith, whereby the blades can be raised at will above the ground surface. When the apparatus is properly positioned, the cylinders 9, 9a associated with the cutting blades 12, 12a are actuated. These blades penetrate into the soil with a movement of translation, their lower and lateral edges converging toward each other until they contact or substantially contact each other, after having cut the ball of earth and the pivoting root of the tree. Upon completion of this operation the operator lifts the support 1 by means of the luffing arm 2, thus raising the tree and the ball attached thereto. The tree is kept in position by the heel 18 safely pressing the ball against the blades 12, 12a. On the other hand, a hole 19 of same dimensions has previously been formed in the soil where it is desired to replant the tree, a similar or the same apparatus being used to this end. This hole is made in the same manner as described hereinabove for rooting up the tree. If the hole 19 is relatively near to the place where the tree has just been rooted up, the operator simply moves the apparatus to a position close to this hole and lowers the convergent blades therein, with the ball of earth clamped therebetween and holding the tree. When the blades 12, 12a engage the edges of the new hole, they are moved away from each other by actuating their cylinders while maintaining a sufficient pressure with the heel 18 around the tree in order to keep it in a vertical position and facilitate the sliding convergent movement of the blades.

On the other hand, if the place to be (re)afforested is relatively remote from the place where the tree was rooted up, the mould illustrated in FIGURES 5 to 7 and adapted to be taken to pieces is used. This mould consists of two substantially identical halves 20, 20a assembled by means of pegs 21 engaging perforated lugs 22, 22a in order to form between the mould sides a volume corresponding to that formed by the blades of the apparatus. This mould is provided with handles 23, 23a to permit its handling. Thus, it will be seen that the tree can be transported to relatively remote locations by simply stripping the ball of earth with the roots and the tree into said mould. When the mould thus filled is delivered to the replanting place it is lowered into the hole having exactly the same dimensions (see FIGURE 6), since it has been dug with an apparatus of same size as the apparatus used for rooting up the tree; then the pegs 21 are removed and the handles 23, 23a are pulled up to slide the mould along the ball of earth, thus leaving the latter in position in the hole.

Of course, it would not constitute a departure from this invention to provide three or more converging blades each having the shape of a surface section cut from a cylinder or a prism, or from a plane surface. In this case, of course, a hydraulic, pneumatic cylinder or other control device is associated with each blade, although suitable and known means may be provided for controlling a plurality of blades from a single common control cylinder.

On the other hand, in the examples illustrated the cutting blades are actuated by means of hydraulic cylinders, but it will be readily understood by anybody conversant with the art that other control means may be used without departing from the spirit of the invention.

Besides, the invention should not be construed as being limited by the specific form of embodiment shown and described herein, as many modifications and alterations may be brought thereto without departing from the spirit and scope of the invention as set forth in the appended claims.

What I claim is:

Apparatus for uprooting and transplanting plants comprising support means, arms projecting from said support means in generally opposite lateral directions, means pivotally connecting said arms to said support means, first and second independent power-driven means mounted on said arms and positioned in offset relation to said support means whereby to enable power driving operations free of interference with the support means, said power-driven means being adapted to exert thrust and retraction forces along mutually intersecting lines which are approximately perpendicular to said arms, means to fix said arms relative to each other and to said support means whereby the angle at which said lines intersect can be selected, cutting blades coupled to and driven by said power-driven means and being adapted for being driven along said lines by the power-driven means to abutting relationship whereat said blades cooperatively form a downwardly tapering and upwardly open cup, each said blade having generatrices parallel to the corresponding one of said lines and being driven in the direction of said generatrices, a further power-driven means on said support means adapted to exert thrust and retract forces in a vertical direction, and a heel means coupled to and driven by said further means independently of the first said power-driven means, said heel means being adapted to straddle a plant having its roots in earth in said cup and to be driven downwardly against said earth.

References Cited by the Examiner

UNITED STATES PATENTS

| 110,211 | 12/70 | Davis | 294—50.8 X |
|---|---|---|---|
| 220,251 | 10/79 | Needham | 294—50.7 |
| 522,039 | 6/94 | Baldridge | 294—50.7 X |
| 1,464,534 | 8/23 | Lovett | 47—37 |
| 1,776,375 | 9/30 | Russell | 47—37 |
| 1,799,967 | 4/31 | Geiger | 47—37 |
| 2,219,690 | 10/40 | Leydecker | 47—37 |
| 2,549,476 | 4/51 | Johnson. | |
| 2,652,639 | 9/53 | Kluckhohn | 37—2 |
| 2,740,234 | 4/56 | Van Norman | 294—50.7 |
| 2,769,278 | 11/56 | Wassell | 37—2 |
| 2,770,076 | 11/56 | Kluckhohn | 47—58 |
| 2,863,258 | 12/58 | Gish | 294—50.7 X |
| 2,956,834 | 10/60 | Embree | 294—88 |
| 3,010,751 | 11/61 | Day | 294—106 X |
| 3,017,707 | 1/62 | Sigler | 37—2 |
| 3,017,719 | 1/62 | Sigler | 47—58 |
| 3,045,368 | 7/62 | Whitcomb | 37—2 |

FOREIGN PATENTS

| 42,340 | 1/33 | Czechoslovakia. |
|---|---|---|
| 1,061,869 | 12/53 | France. |
| 412,407 | 6/34 | Great Britain. |

SAMUEL F. COLEMAN, *Primary Examiner.*

A. JOSEPH GOLDBERG, T. GRAHAM CRAVER,

*Examiners.*